UNITED STATES PATENT OFFICE.

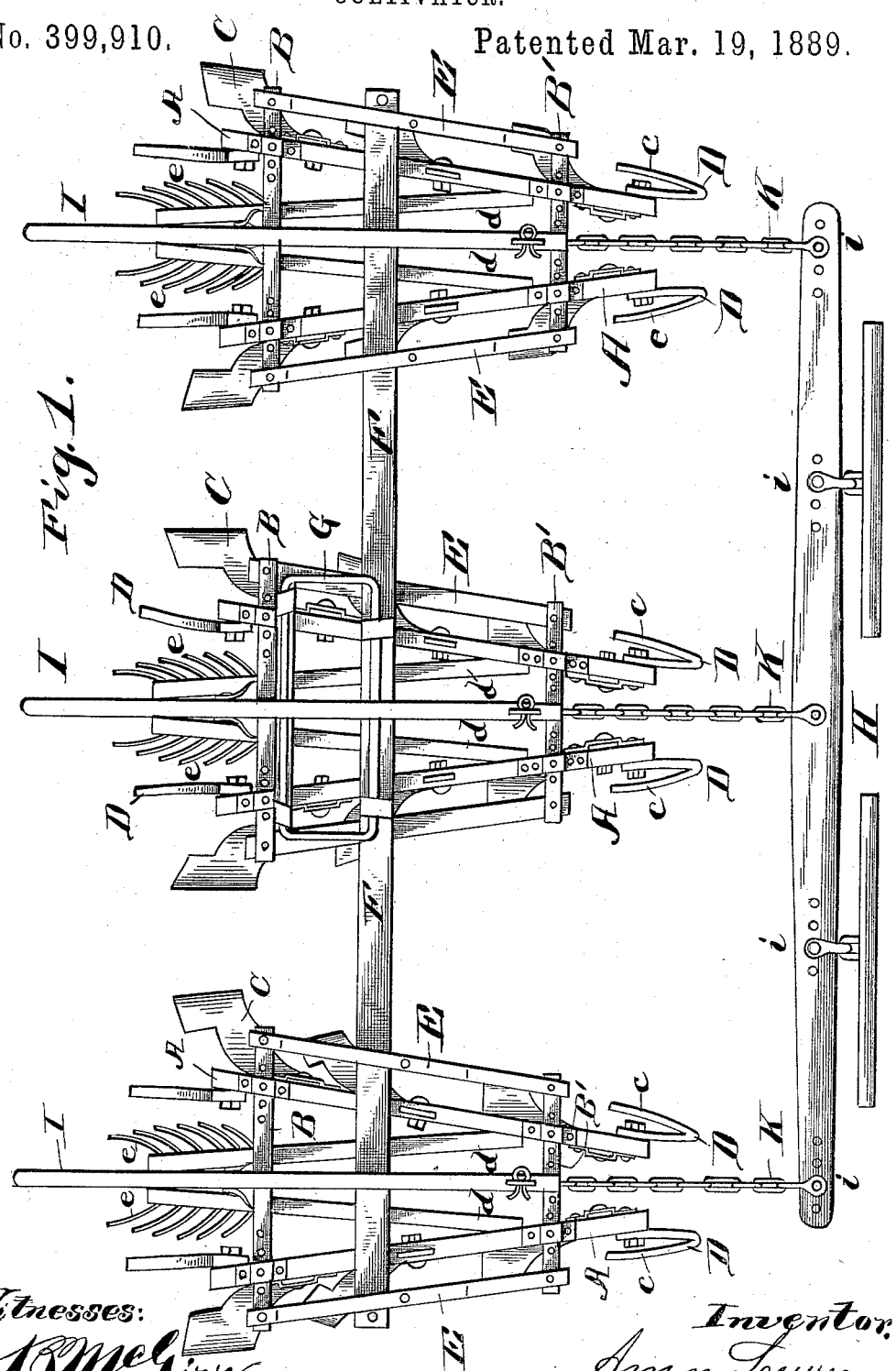

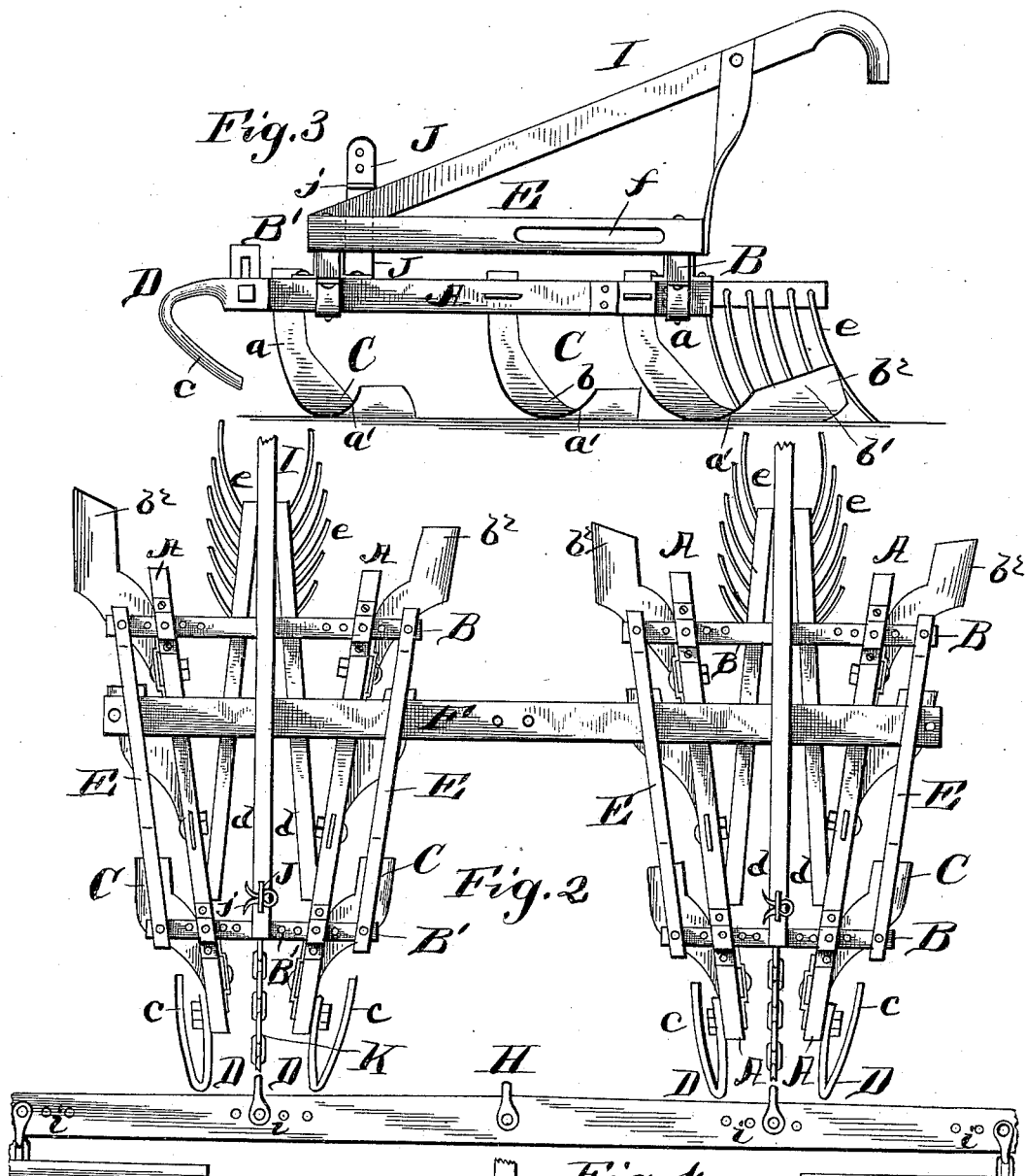

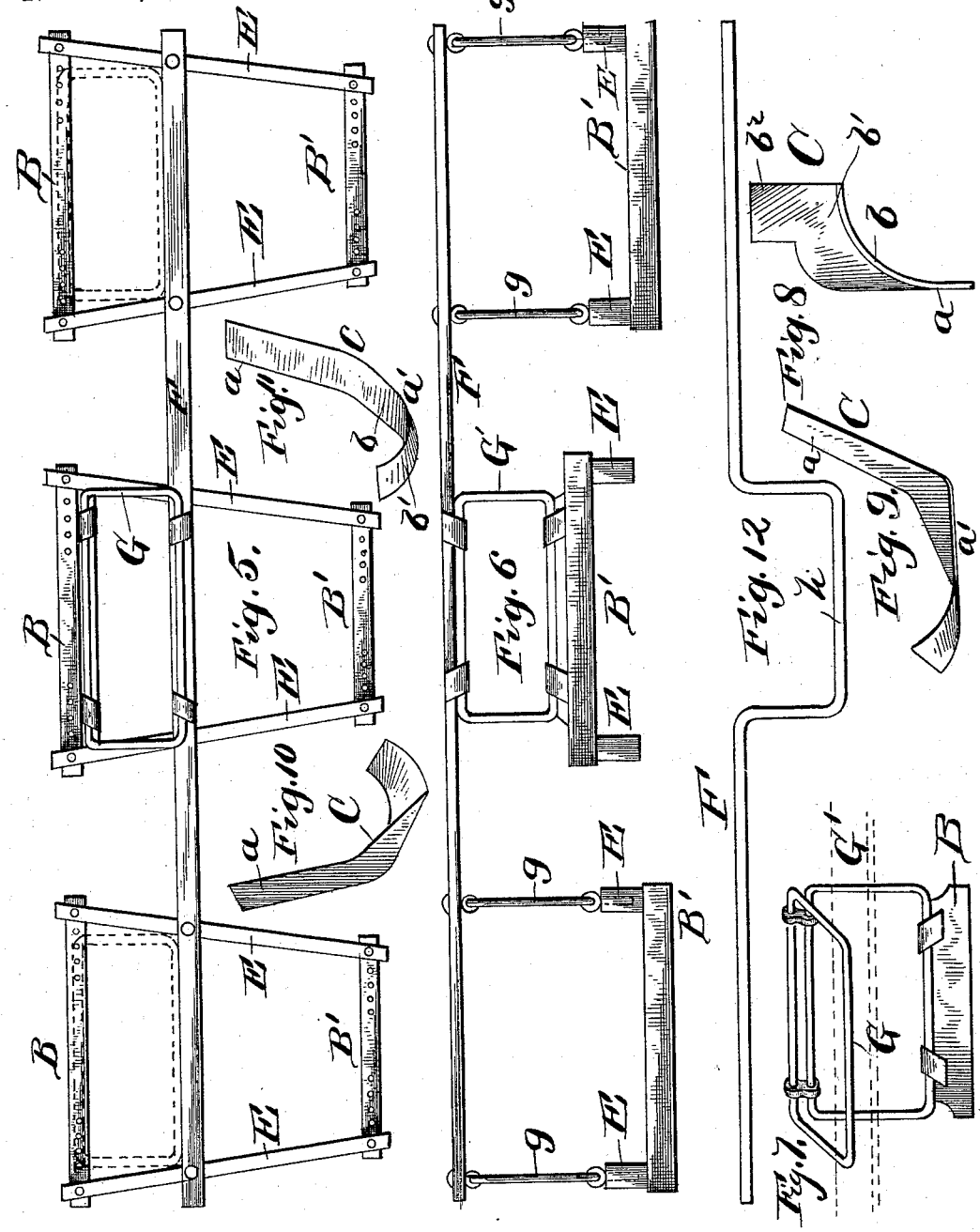

AMOS LEWIS, OF TARKIO, MISSOURI.

CULTIVATOR.

SPECIFICATION forming part of Letters Patent No. 399,910, dated March 19, 1889.

Application filed August 3, 1888. Serial No. 281,909. (No model.)

*To all whom it may concern:*

Be it known that I, AMOS LEWIS, of Tarkio, in the county of Atchison and State of Missouri, have invented certain new and useful Improvements in Cultivators for Listed Crops; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in cultivators, and more particularly to an improved cultivator especially adapted for cultivating listed corn or other cereals.

It should be understood that by "listed corn" is meant corn planted along the bottom of deep furrows or lists made usually by "lister-plows" especially constructed for that purpose, which throws the earth on either side, forming a deep furrow.

Heretofore listed corn has been cultivated with harrows, and the cultivators of the plan used before the system of "listing" became generally known, and with also a few instruments, which have been constructed since, with a view to cultivate listed corn; but these instruments heretofore used in operation do not go down into the bottom and sides of the lists and mellow up the ground and destroy the weeds and grass growing there. On the contrary, they commence on the top of the ridges between the rows and scrape or slide the dirt down into the lists, depending on the dirt thus moved into the lists to cover up the weeds and grass. In operation these instruments are very unsatisfactory, because they do not mellow up the dirt around the young corn, nor do they effectually destroy the weeds and grass inside of the list.

The object of my invention is to provide a cultivator which will mellow up the dirt at the bottom and sides of the lists around the young corn, and at the same time cut and destroy the weeds and grass that grow in the sides of the lists; also to construct the device so that in later cultivations, as the corn grows larger and demands more earth, the instrument can be adjusted or spread, so as to gather the earth from the ridges between the rows and move it to and around the corn.

A further object of my invention is to combine two, three, or more cultivators together in such a manner that they will each straddle a row and cultivate it on both sides and automatically vary from line of draft sufficient to accommodate themselves to the variations in distance between the lists occupied by the respective cultivators.

A further object of my invention is to produce a cultivator tooth or blade constructed in such a manner as to dispense with all unnecessary draft—such as land or bar side friction—dragging of stalks and trash through the ground, and the extra draft—such as is produced by scraping-blades or of shovel-plows, which tear, instead of cutting, the dirt from the ridges. To accomplish this I have constructed a blade which presents an oblique curved cutting-edge to all parts of the earth with which it comes in contact. To remove the bar-side friction, the blade is so constructed that the bar or back side runs next to the corn in the hollow of the list without obstruction, while the share or cutting portion extends outward, upward, and backward into the elevated bank of the list, severing the dirt and passing it from the share or outside of the blade across the same to the bar or inside around the corn. Thus it will be readily seen that no force or power need be unnecessarily expended in forcing the standard or bar of the blade through the earth. In some of the plows and blades as heretofore constructed the bar is forced through the ground and the earth moved from the bar side toward the share side, moving the dirt in exactly the opposite direction as regards the bar of the blade as that in which the earth is thrown by my construction. It is also noted that the bar of each succeeding blade follows in the furrow formed by the share of the preceding blade, thus further saving of draft. It should also be observed that when forming the lists the lister-plows throw the stalks and other trash into the tops of the ridges, and that in cultivating the corn the share of my blade passes beneath the stalks and raises them up and throws them inward over the back portion of the blade, while the devices heretofore in use, by reason of the fact that the bars have to pass through the earth, had to cut the stalks or ride over them, the latter generally being the result, thus raising the knives out of the ground much of the time and producing an irregular stirring of the soil and imperfect cultivation of the corn. In some instances heretofore harrow scrapers or cutters have been made of steel in tapering form, coming down to a point at the lower end, with the front edge sharpened and the lower portion curled or twisted backward and upward, so that the earth will merely slide directly across the blade in the line of draft and through the curved portion, instead of being, as by my blade, thrown inwardly to and around the corn. In fact, it would be impossible for this old form of tooth to throw the earth inwardly, by reason of the tapered form, which renders it impossible for the outer rear edge to be bent inwardly; and, further, these old cutters have their rear edges raised or in a plane higher than the front edges, thus becoming harrow-scrapers and merely cutting and pulverizing the earth, while my article lies nearly flat and is a cultivator-blade for moving the earth inwardly.

Another object is to produce a cultivator that keeps its proper position without being held by the hands of the operator, and requires no constant care to keep it in position.

A further object is to provide a gang-cultivator which shall be so constructed and connected that each separate section can raise or lower, spread from or come nearer its fellow, or move forward or backward independent of the others, and yet prevent them from tipping over and cause them to keep the blades in the same or a plane parallel with the surface of the ground; and a further object is to provide a gang-cultivator with an improved doubletree so constructed that it can be connected with two, three, or any suitable number of cultivator-sections, and so that it can be drawn and connected with two, three, or four horses abreast, and so further arranged that each horse may be made to pull an equal proportion, or one horse more and another horse less.

With these ends in view my invention consists in certain novel features of construction and combinations of parts, more fully described hereinafter, and particularly pointed out in the claims.

Referring to the accompanying drawings, Figure 1 is a top plan view of three cultivators attached to the doubletree for cultivating three rows at once. Fig. 2 is a similar view of two cultivators attached to the same kind of a doubletree for cultivating two rows. Fig. 3 is a side elevation of one of the cultivator-sections detached. Fig. 4 is a rear end view of the same, the upper portion of the frame being shown broken away. Figs. 5 and 6 are respectively a top plan and side elevation of a modified form of bar connecting the cultivators, the top frames only of the cultivators being shown. Fig. 7 is a detail perspective view of the links connecting the connecting-bar shown in Figs. 5 and 6, with the center cultivator of the gang. Fig. 8 is a bottom view of my preferred form of blade, as shown in side elevation in Fig. 3. Fig. 9 is an elevation of a modified form of blade, looking at the outer side of the same. Fig. 10 is a perspective view of the same blade from the opposite side. Fig. 11 is a perspective view of still a different form of blade, and Fig. 12 is another form of connecting-rod.

In the drawings, the reference-letter A indicates the plow-beams, each cultivator being provided with a pair of the same connected at the front and rear ends by the cross-pieces B B' and by straps $B^2$, secured to said cross-pieces and arched or bent upwardly in the center to allow the corn to pass. The cross-bars are located above the plow-beams and the straps below, and the bars and straps are provided with registering series of apertures adapted to register with apertures through the ends of the plow-beams. Thus it will be observed that said beams can be adjusted at both ends to or away from each other, and when in the desired adjustment they are held in position by pins passed through the apertures in the cross-bars, plow-beams, and straps, as clearly shown, and for the purpose hereinbefore mentioned. The frame of each cultivator is approximately V-shaped, as shown, and each plow-beam is provided with a suitable number of cultivating-blades, C, preferably three in number, of a peculiar and greatly-improved construction.

My preferred form of blade is formed of one piece of metal, and consists of a bar portion, $a$, and a dirt-moving portion, $a'$. The bar portion is rigidly and suitably attached to a plow-beam or other device, and extends downwardly and is continuous with the dirt-moving portions $a'$, and the dirt-moving portion curves or extends first backward, downward, and outwardly, as shown at $b$, and continues outward and upward, as shown at $b'$, which is curved slightly inward and upward at its rear outer end. The blade is provided with a rearwardly-extending wing, $b^2$, bent slightly inwardly at its rear upper corner or edge.

It should be observed that I term the front cutting-edge of the blade the "share" side, and the rear edge, from which the dirt passes, the "bar" side, and that the share side is a cutting-edge its entire length and is a continuation of the front side of the bar, and the bar side is not a cutting-edge and is a continuation of the rear edge of the bar. Thus it will be seen that in operation as the front blades are closer together than the rear blades and that the bars of the succeeding blades will pass in the furrows formed by the dirt-moving portions of the preceding blades, and that the bars of the blades are next to the corn, while the cutting portions extend outwardly into the sides of the list and move the dirt from the share side transversely and diagonally across the blade to the bar side and give it an inward throw toward the corn, as fully set forth and explained with advantages hereinbefore.

In Figs. 9 and 10 a modified form of blade is shown constructed after the same principles, but somewhat different in form. Instead of curving gradually downward, outward, and upward at its dirt-moving portion, it forms a sharp turn or angle and extends farther rearwardly, and does not curve upwardly as much and has no rearwardly-extending wing; but its rear outer corner is curved upwardly and inwardly to give the dirt an inward throw from the share side to the bar side, and also the portion of the dirt-moving part of the blade next to the bar is flatter than in the preferred construction. In Fig. 11 is shown still a different form of blade, operating in the same manner as the others. In this form the bar is the same as those above described and the dirt-moving portion extends downwardly, outwardly, and rearwardly, and then upwardly, outwardly, and rearwardly, and its rear outer corner is curved upwardly and inwardly, and is not provided with the rearwardly-extending wing.

At their forward ends I provide each plow-beam with an adjustable guide, D, each guide, as shown clearly in Fig. 3, being secured in vertical adjustment to the end of a plow-beam and extending forwardly and then curved around and extending rearwardly and downwardly to form the lower guiding edge or runner-guide, c. The two guides on the forward end of each cultivator slides in the lists on each side of the corn and have their lower ends bent outwardly to hold the cultivator in the center of the list and limit the depth to which the blades enter the ground, and also causing the cultivator to follow closely the line of the list. If desired, the rear ends of the cultivators can be provided with similar guides, as shown in Fig. 1, to regulate the cutting depth of the rear blades.

Each cultivator is provided with fenders—one on each side of the corn—and each composed of a beam, d, secured to a plow-beam near its front portion and extending rearwardly, and at its rear end provided with a series of downwardly and rearwardly curved teeth or wires, e, placed a suitable distance apart to prevent large lumps of earth, &c., from falling upon the corn, and yet allowing the fine earth to sift around and fill in between the corn. A pair of these fenders is located on each cultivator, and is similarly located on each side of the row of corn.

My invention not only relates to details of construction of parts of a cultivator, but also has reference to the construction and connections of a gang-cultivator. In Fig. 1 I show a gang-cultivator to cultivate three rows or lists at once and employing two horses. The outer ends of the cross-bars B and B' are extended beyond the plow-beams and connected at their outer ends by the side beams, E, as shown, the side beams of the end cultivators being preferably placed on top of the cross-bars and the side beams of central cultivator beneath the cross-bars. My preferred manner of connecting the cultivators is by a single rigid transverse connecting-bar, F, extending across the tops of the cultivators and loosely secured to the central cultivator, preferably by a link, G, loosely confined to the cultivator-frame by staples or other means to allow a limited backward, forward, lateral, and also free up-and-down movement, and the opposite side of the link is secured to the connecting-bar in a similar manner to allow a free play of said bar independent of the cultivator. The opposite ends of the connecting-bar pass loosely through longitudinal horizontal slots f, Fig. 3, in the side beams, E, of the cultivators on each side of the central cultivator. Thus the same are connected loosely together and to the central cultivator. Said slots should be of sufficient length to allow for the irregular movement of the various sections. As mentioned in the statement of invention, the sections by this arrangement can move independent of each other, and yet are prevented from overturning. The link-connection of the bar F to the center cultivator is of great importance and advantage, for it secures the connecting-bar to the central cultivator and allows the same to rise and fall and move laterally, and allows the opposite ends of the same to swing back and forward.

The leading object of using the slotted side bars and links in connection with the connecting-bar is to keep the cutting-blades of all the sections parallel with the plane of their work and to prevent the various sections from turning over without impeding the various other motions which the cultivators would naturally possess and which are necessary to the successful operation of the machine—such as lateral motion—necessary when the spaces between the rows vary, and forward motion necessary when one horse goes ahead of the other, and angular motion as is necessary when turning around, and up-and-down motion necessary when cleaning the blades. All the various modifications of the connections with the connecting-bars herein described are designed for the same purposes.

In Fig. 2 is shown a mode of connecting two cultivators, the central cultivator and the connecting-bar of Fig. 1 being removed, and a straight rigid bar, F, being passed through the slots f of the side bars, and said bar is held in position by one or more suitable pins passed through its central part and also through its ends. In Figs. 5, 6, and 7 is shown a different manner of loosely coupling together the cultivators. The connecting-bar F passes over the cultivators a suitable distance above the same, and is connected to the side cultivators by upright rods g, one rod for each side beam. Said rods are pivoted to the side bars at their lower ends and to the connecting-bar at their upper ends, as clearly shown, and the said bar is loosely confined to the central cultivator by an upright link, G', loosely secured at its lower side to the cultivator-frame and by a horizontal link, G, loosely secured to the connecting-bar, as described in Fig. 1, and at its opposite side hinged to the upright link, as shown, and said links are secured in position to allow the universal movement described in connection with Fig. 1. This is a very effective construction. The connecting-bar F might also be secured to the cultivators to allow free and independent movement of the same by links secured to each cultivator and to the connecting-bar, as shown by dotted lines in Fig. 5, similar to the coupling between the central cultivator and the connecting-bar, as shown in Fig. 1.

In Fig. 12 is shown a connecting-bar composed of a single piece of gas-pipe or other suitable material for use with three cultivators, the ends of the pipe extending through the slots $f$ and the central bend, $h$, being loosely confined to the central cultivator-frame in a manner similar to and acting as a substitute for the link G, as will be readily understood.

H indicates a doubletree for use with two or more cultivators and to which may be attached two or more horses. The doubletree extends the distance between the cultivators and a suitable distance in front of each one, and at suitable intervals throughout its length the doubletree is provided with a series of apertures, $i$, located, when in position, directly over the lists and over the ridges between the lists.

J indicates an upright vertically-adjustable draw-bar centrally secured in the fore part of the frame, preferably extending through a cross-bar or the lower portion of the handle I, and consisting, preferably, of a flat bar provided with a longitudinal series of transverse apertures, as shown, and at its lower end with a suitable eye or opening, to which the draft-chain K is secured.

The draw-bar can be raised or lowered to regulate the draft and cutting depth of the blades, and is held in the desired position by a pin, $j$, or other means passing through one of the apertures and resting on the top of the cross-bar or handle.

It will be readily seen that the draft-chains K extend directly from the draw-bars to the doubletree.

The object of the series of apertures in the doubletree in front of each cultivator is to allow the draft-chains to be moved toward or from each other to accommodate the device to fields whose lists are different distances apart, and the series of apertures where the horses are attached is to allow the point of strain or draft on the tree to be varied so that the horses will pull an equal proportion, or they can be adjusted so that one horse will pull more and another less.

Where three cultivators and two horses are employed, as in Fig. 1, the horses will be hitched at the series of apertures between the series at which the cultivators are connected, and when two cultivators and horses are to be used the horses are hitched at the outer ends and the cultivators at the series of apertures where the horses are hitched when three cultivators are used. (See Fig. 2.)

It is not necessary that the point of draft of the central cultivator on the doubletree be changed; hence the clevis at that point is not laterally adjustable. Each cultivator is provided with a single central handle, I.

The great advantages and utility of the herein-described device can be readily seen by all practical farmers and others acquainted with this manner of cultivating corn and other grain.

It is evident that various changes might be resorted to in the form and arrangement of the parts described without departing from the spirit and scope of my invention. Hence I do not wish to limit myself strictly to the construction herein set forth, but consider myself entitled to all such changes.

What I claim is—

1. A cultivator-blade consisting of a bar portion to be attached to a beam and a dirt-moving portion forming a continuation of the bar portion and extending downward and rearward and then outward and having its outer portion extending upwardly, rearwardly, and inwardly, the share or front side of the bar being provided with a cutting-edge, whereby the earth is passed from the share side across the dirt-moving portion to the bar side and is thrown inwardly to the corn by the rearwardly and inwardly extending edge, substantially as set forth.

2. In a cultivator, the combination, with a pair of rearwardly and outwardly diverging beams, of two or more cultivator-blades carried by each beam, each blade being formed in one piece and comprising a bar portion and a dirt-moving portion, the bar portion being secured to the beam so that the dirt-moving portion will extend downward and outward and continue outward and upward and backward and inward at its rear outer edge, whereby the dirt is thrown inwardly, as described, and the bars of the succeeding blades pass in the furrows formed by the dirt-moving portions of the preceding blades, as set forth.

3. In a lister-cultivator, the combination, with two or more cultivator-sections provided with slotted side beams, of a transverse connecting-bar extending across the sections and through the slotted side beams to connect the sections together and allow independent movement of the same, substantially as described.

4. In a lister-cultivator, the combination, with the plow-beams, of a pair of guides adjustably secured to the same and curving forwardly and then rearwardly and downwardly, forming guiding edges or runners, having their lower ends bent outwardly to hold the cultivator in the center and cause it to follow the line of the list, substantially as described.

5. In a gang-cultivator, two or more cultivator-sections, each adapted to straddle a row, in combination with a rigid transverse connecting-bar extending across and loosely joining the sections together, and one or more links loosely joining the bar and one or more of said sections to allow independent vertical movement of said bar and section or sections, substantially as set forth.

6. In a gang-cultivator, the combination of one or more cultivator-sections, a transverse connecting-bar, a link loosely securing the bar to the central section, and side beams on the other sections, through which the bar loosely extends and in which it is confined, substantially as set forth.

7. In a gang lister-cultivator, the combination, with the cultivator-sections, each having guides running in the lists to hold the sections in the same, of a doubletree extending the distance between the sections, a vertically-adjustable draw-bar carried at the forward portion of each cultivator-frame, draft-chains directly attaching the doubletree to the lower ends of the draw-bars, and a rigid transverse connecting-bar loosely connecting the sections to allow variations of each section from the line of draft and yet prevent the same from overturning, substantially as set forth.

In testimony that I claim the foregoing as my own I affix my signature in presence of two witnesses.

AMOS LEWIS.

Witnesses:
HUBERT E. PECK,
CHAS. M. WERLE.